United States Patent [19]

Roark

[11] Patent Number: 4,614,593

[45] Date of Patent: Sep. 30, 1986

[54] DEMULSIFICATION OF OIL-IN-WATER EMULSIONS

[75] Inventor: David N. Roark, Baton Rouge, La.

[73] Assignee: Ethyl Corporation, Richmond, Va.

[21] Appl. No.: 775,167

[22] Filed: Sep. 12, 1985

Related U.S. Application Data

[63] Continuation-in-part of Ser. No. 716,938, Mar. 28, 1985.

[51] Int. Cl.$^4$ ................................................ C02F 1/56
[52] U.S. Cl. ........................................ 210/708; 210/735; 252/344; 252/358
[58] Field of Search ........................ 166/267; 208/188; 210/708, 725, 727, 728, 732, 735, 736, 749; 252/344, 358

[56] References Cited

U.S. PATENT DOCUMENTS

| | | | |
|---|---|---|---|
| 2,456,428 | 12/1948 | Parker | 521/31 |
| 2,662,875 | 12/1953 | Chaney | 526/310 |
| 3,062,798 | 11/1962 | Lovett | 526/236 |
| 3,210,308 | 10/1965 | Garms et al. | 524/765 |
| 3,316,181 | 4/1967 | Sackis | 252/344 |
| 3,409,547 | 11/1968 | Dajani | 210/735 |
| 3,585,148 | 6/1971 | Sackis | 210/708 |
| 3,673,164 | 6/1972 | Jones et al. | 526/291 |
| 3,691,086 | 9/1972 | Lees et al. | 252/344 |
| 3,715,336 | 2/1973 | Nowak et al. | 210/735 |
| 4,018,826 | 4/1977 | Gless, Jr. et al. | 526/12 |
| 4,021,484 | 5/1977 | Toda et al. | 526/23 |
| 4,053,512 | 10/1977 | Panzer et al. | 210/734 |
| 4,104,161 | 8/1978 | Wein | 210/736 |
| 4,120,815 | 10/1978 | Raman | 252/34 A |
| 4,217,214 | 8/1980 | Dubin | 210/735 |
| 4,329,441 | 5/1982 | Bergthaller | 526/193 |
| 4,383,926 | 5/1983 | Boriks et al. | 210/708 |
| 4,444,654 | 4/1984 | Cargle et al. | 210/708 |
| 4,457,371 | 7/1984 | McCoy et al. | 210/708 |
| 4,504,640 | 3/1985 | Harada et al. | 526/212 |
| 4,528,347 | 7/1985 | Harada et al. | 526/219 |
| 4,540,760 | 9/1985 | Harada et al. | 526/211 |

FOREIGN PATENT DOCUMENTS 95233 11/1983 European Pat. Off. .
131306 1/1985 European Pat. Off. .

OTHER PUBLICATIONS

Kajisaki, et al, Bull. Govt. Research Inst. Ceram. (Kyoto), vol. 6, pp. 25–28 (1952) and translation thereof.
R. C. Laible, Allyl Polymerizations, Chem. Rev., 58 (5), 807–843 (1958).
Chem. Abstracts, vol. 61, 8473h (1964), an abstract of Vittikh et al, Teoriya i Prakt. Ionnogo Obmena, Akad Nauk Kaz SSR, Tr. Resp Soveshch 1962, 21–23 w/translation.
Chemical Abstracts, vol. 61, 14855b (1964), an abstract of Zykova, et al, Tr. Inst. Khim. Nauk, Akad, Nauk Kaz. SSR 11, 89–94 (1964) w/translation.
Chemical Abstracts, vol. 62, 7955a (1965), an abstract of USSR 166,831 w/translation.
Colin, Terres & Eaux, 1968, 21 (55), pp. 27–28.
C. E. Schildknecht, Allyl Compounds and Their Polymers, Wiley, Interscience Pub., Copyright 1973, pp. 29–30 and 523–524.
S. Harada & S. Hasegawa, Macromolecular Chem. Rapid Communications, 5, 27–31 (1984).
Polyallylamine Hydrochloride, Nitto Boseki Co., Ltd., Tokyo, Japan.

*Primary Examiner*—Peter Hruskoci
*Attorney, Agent, or Firm*—Donald L. Johnson; John F. Sieberth

[57] ABSTRACT

A water-soluble polymer of monoallylamine is used as a demulsifying agent for breaking oil-in-water emulsions. This enables rapid and efficient separation between the aqueous phase and the liquid organic phase by a variety of conventional physical techniques such as settling and decantation, centrifugation, and the like.

37 Claims, No Drawings

DEMULSIFICATION OF OIL-IN-WATER EMULSIONS

This application is a continuation-in-part of prior co-pending application Ser. No. 716,938, filed Mar. 28, 1985.

This invention relates to methods for breaking oil-in-water emulsions by use of new, highly effective demulsifying agents.

As is well-known, oil-in-water emulsions are systems in which the dispersed, discontinuous, or internal phase is an organic liquid broken up in the form of globules, and the continuous or external phase is an aqueous medium. The organic liquid is of course quite insoluble in the aqueous phase, and in many cases is an oleagenous liquid.

Oftentimes it is necessary or desirable to break such emulsions. While mechanical devices are sometimes useful for this purpose, it is usually more desirable to use a demulsifying agent. Heretofore various materials have been proposed for this use, and some of the more cost-effective materials have achieved commercial success.

In accordance with this invention new, highly effective demulsifying agents for use in breaking oil-in-water emulsions have been discovered. These demulsifying agents are the water-soluble polymers of monoallylamine. Experiments have shown that this invention makes it possible to break oil-in-water emulsions with a much smaller quantity of a demulsifier of this invention than the required amount of a commercially available demulsifier which is reportedly the most widely used industrial demusifying agent. Moreover not only was less demulsifier needed, but phase separation of oil and water was better, and the water phase was much clearer than the emulsions treated with the commercially available demulsifying agent.

Accordingly, in one of its embodiments this invention provides a process of demulsifying an oil-in-water emulsion which comprises admixing with the emulsion a water-soluble polymer of monoallylamine—e.g., a water-soluble poly(monoallylamine) or a water-soluble salt thereof, or both—so that formation of and separation between an oil phase and an aqueous phase occur. By treating an oil-in-water emulsion with a water-soluble polymer of monoallylamine, such as water-soluble poly(monoallylamine) or a water-soluble salt thereof, the emulsion can be broken within the aqueous medium itself in a relatively short period of time. Thereupon it is an easy matter to physically separate a distinct organic phase and a distinct aqueous phase, for example by centrifugation, or by settling followed by decantation.

It will be noted that the polymer of monoallylamine used as the demulsifying agent may be in the form of a free base (i.e., the pendant —CH$_2$NH$_2$ groups are not neutralized with an acid) or it may be in the form of a partially or completely neutralized polymer (i.e., some or all of the pendant —CH$_2$NH$_2$ groups are neutralized with an acid and thus are in salt form). Such salts are also referred to in the chemical arts as poly(monoallylammonium) salts.

Accordingly, a preferred group of polymers of monoallylamine used pursuant to this invention may be depicted by the general formula:

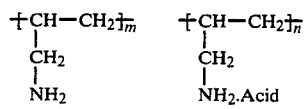

where m is a number from zero to 100,000 or more and n is a number from zero to 100,000 or more, the sum of m plus n being in the range of about 10 to about 100,000 or more. In the formula, Acid represents an organic or inorganic acid complexed with the amino group in the form of a salt. When n is zero or is very small relative to m, the polymer may be deemed for all practical purposes a water-soluble poly(monoallylamine). On the other hand when m is zero or is very small relative to n, the polymer may be deemed for all practical purposes a water-soluble salt of poly(monoallylamine). There is of course no hard and fast dividing line between the two since the transition from one end of the scale to the other is a continuum.

Other preferred polymers of monoallylamine used pursuant to this invention are polymers as above depicted that have been chemically modified during their manufacture by copolymerization with small quantities of suitable polymerizable comonomers containing two or more double bonds in the molecule (e.g., triallylamine hydrochloride and the like) or by crosslinking or bridging with small quantities of a crosslinking agent having two or more groups reactable with the amino group (e.g., epichlorohydrin, ethylene dichloride, and the like). These chemically modified monoallylamine polymers have essentially the same properties and characteristics as the unmodified polymers depicted above except of course those related to molecular weight.

These and other embodiments of the invention will be still further apparent from the ensuing description and appended claims.

As noted above, the polymers of monoallylamine used in the practice of this invention (whether modified or unmodified) are water soluble in the sense that no visible settling of a precipitate occurs from a solution of the polymer in water at 25° C. within one hour after the solution is formed. To the naked eye the polymers appear to dissolve in the water and form a true solution, although it is possible that stable colloidal suspensions or microgels may actually be formed at least in some cases. Irrespective of the physico-chemical mechanism or other niceties that may possibly be involved when the polymer is mixed with water, the important point is that the polymer does not settle out and for all practical purposes it behaves as if it is in solution.

Any water-soluble polymer of monoallylamine, i.e., poly(monoallylamine) or water-soluble poly(monoallylammonium) salt, whether a homopolymer or a copolymer or a crosslinked homopolymer or copolymer, that breaks an oil-in-water emulsion when introduced therein can be used in the practice of this invention. This includes the homopolymer of monoallylamine and such polymeric salts as poly(monoallylammonium chloride) (also referred to as polyallylamine hydrochloride), poly(monoallylammonium bromide), poly(monoallylammonium bisulfate), poly(monoallylammonium sulfate), poly(monoallylammonium nitrate), poly(monoallylammonium dihydrogen phosphate), poly(monoallylammonium hydrogen phosphate), poly(monoallylammonium phosphate), poly(monoallylammonium formate), poly(monoallylammonium acetate), poly(- monoallylammonium propionate), poly(monoallylammonium p-toluenesulfonate), and the like. In the case of some salts such as the sulfate and phosphate salts of polymers of monoallylamine it is desirable to employ polymers in which only a small proportion of the primary amino groups have been neutralized by sulfuric acid or the phosphoric acid inasmuch as the water solubility of the sulfate and phosphate polymers decreases with increasing sulfate or phosphate content. In fact, completely neutralized poly(monoallylamine) sulfate (poly(monoallylammonium sulfate)) and completely neutralized poly(monoallylamine) phosphate (poly(monoallylammonium phosphate)) tend to be essentially water insoluble. The preferred polymeric salts are the poly(monoallylammonium chlorides).

Water-soluble polymers of monoallylamine falling within a relatively wide range of molecular weights are suitable. For example, use may be made of water-soluble polymers in salt form (e.g., unmodified poly(monoallylammonium hydrochloride) having a weight average molecular weight (as determined by the equilibrium sedimentation method—see B. Vollmert, *Polymer Chemistry*, Springer-Verlag, New York, Copyright 1973, pp 361-369)—ranging upwards from about 1,000, and preferably ranging upwards from about 5,000. Water-soluble modified (e.g., suitably crosslinked) polymers in salt form with weight average molecular weights ranging up to about 500,000 or more are preferred, those falling in the range of about 10,000 to about 200,000 being particularly preferred. The weight average molecular weight (same test method) of the free (i.e., unneutralized) uncrosslinked poly(monoallylamines) ranges upwards from about 600, and preferably upwards from about 3,000. Water-soluble modified (e.g., suitably cross-linked) polymers in free (i.e., non-salt) form with weight average molecular weights ranging up to about 300,000 or more are preferred. Water-soluble polymers of monoallylamine having weight average molecular weights falling outside of the foregoing molecular weight ranges may also be used, provided of course that their suitability and efficacy are established, for example by performing a few tests.

Methods for the synthesis of water-soluble polymers of monoallylamine (homopolymers and copolymers, both free bases and salts thereof, and crosslinked or bridged polymers thereof) have been reported in the literature. See for example U.S. Pat. Nos. 4,504,640 granted Mar. 12, 1985; 4,528,347 granted July 9, 1985, European patent application Nos. 95,233 published Nov. 30, 1983, 131,306, published Jan. 16, 1985, and S. Harada & S. Hasegawa, *Macromolecular Chem., Rapid Communications*, 5, 27-31 (1984), all such disclosures being incorporated herein by reference. One currently recommended procedure involves hydrochlorination of allylamine followed by radical polymerization of the resulting allylamine hydrochloride. To convert the hydrochloride salt to the free polyallylamine (e.g., from which other water soluble salts can readily be produced) either of two different procedures is usually employed. One involves treatment of the polyallylamine hydrochloride solution with an alkali base such as sodium hydroxide to form an aqueous solution of the sodium chloride salt which is then subjected to dialysis and lyophilization. The other procedure utilizes a strong basic ion exchange resin for converting the polyallylamine hydrochloride solution into the polyallylamine solution which is then subjected to lyophilization to produce the free polymer. Various molecular weight grades of polyallylamine and of polyallylamine hydrochloride are presently available from Nitto Boseki Co., Ltd., Tokyo, Japan.

In preparing the crosslinked polymers of monoallylamine, use may be made of a variety of crosslinking agents. For example use may be made of alpha,beta-epoxy-gamma-haloalkanes, e.g., 3-chloro-1,2-epoxypropane, 3-bromo-1,2-epoxypropane, and 3-iodo-1,2-epoxypropane; and their higher homologs such as 3-chloro-1,2-epoxybutane, 3-bromo-1,2-epoxybutane, 3-iodo-1,2-epoxybutane, 3-chloro-1,2-epoxypentane, 3-chloro-1,2-epoxyhexane, 3-chloro1,2-epoxyheptane, and the like. Likewise, dihaloalkanes may be employed for this purpose, a few typical examples being 1,2-dihaloethanes such as 1,2-dichloroethane (ethylene dichloride), 1,2-dibromoethane (ethylene dibromide), and 1-bromo-2-chloroethane; and their higher homologs such as 1,3-dichloropropane, 1,3-dibromopropane, 1,3-dichlorobutane, 1,4-dichlorobutane, 1,3-dibromobutane, 1,4-dibromobutane, 1,5-dichloropentane, 1,7-dichloro-4,4-dimethylheptane, and the like. Other crosslinking agents, such as dicarboxyl acid chlorides, mono or dialdehydes, and the like, known to those skilled in the art for crosslinking other polymeric materials, may also be used in effecting this crosslinking.

When producing crosslinked polymers of monoallylamine the amount of the crosslinking agent employed should be controlled so as to avoid the formation of water-insoluble crosslinked products. Ordinarily the proportions used will fall in the range of about 50 to about 8,000 parts by weight of cross-linking agent per million parts by weight of the monoallylamine homopolymer or copolymer being subjected to crosslinking. Departures from this range are feasible, and may be found useful. Preferably, from about 250 to about 8,000 ppm of crosslinking agent is employed with poly(monoallylamine) having a weight average molecular weight in the range of about 5,000 to about 100,000, and from about 50 to about 250 ppm of crosslinking agent is employed with poly(monoallylamine) having a weight average molecular weight in the range of about 100,000 to about 350,000. In other words, it is desirable that the relative proportion of crosslinking agent to poly(monoallylamine) be inversely proportional to the weight average molecular weight of the poly(monoallylamine) being crosslinked.

The poly(monoallylamine) subjected to the crosslinking process may be preformed or it may be generated or formed in situ. Preferably the poly(monoallylamine) is formed by neutralizing or partially neutralizing a poly(monoallylammonium) salt such as:

poly(monoallylammonium chloride)—also referred to as polyallylamine hydrochloride
poly(monoallylammonium bromide)
poly(monoallylammonium bisulfate)
poly(monoallylammonium sulfate)
poly(monoallylammonium nitrate)
poly(monoallylammonium dihydrogen phosphate)
poly(monoallylammonium hydrogen phosphate) and
poly(monoallylammonium phosphate).

It is particularly desirable to form the poly(monoallylamine) in situ by rendering an aqueous medium containing one or more of these acid salts neutral or alkaline in pH by the addition of a suitably strong base such as sodium hydroxide, potassium hydroxide, or the like. The preferred polymers for this use are the poly(monoallylammonium chlorides).

Among the polymerizable comonomers that may be used in forming water-soluble monoallylamine copolymers are diallylamine hydrochloride, triallylamine hydrochloride, and the like. The copolymers should contain at least 95% by weight and preferably at least 98% by weight of monoallylamine with the balance being one or more such comonomers.

In practicing this invention the water-soluble polymer of monoallylamine is admixed in the aqueous emulsion preferably with agitation. Heating may be applied but is generally not necessary as the coalescence normally proceeds quite rapidly at ambient temperatures. Thus the temperature of the aqueous emulsion being treated will normally fall in the range of about 0° to about 70° C.

The amount of the water-soluble polymer of monoallylamine introduced into the aqueous emulsion being treated will of course be governed to some extent by the amount of organic material emulsified therein. Thus the demulsifier of this invention is added to the emulsion in an amount at least sufficient to break that particular emulsion. In most cases, this will fall within the range of from about 50 to about 2,500 parts per million parts by weight of emulsion being treated, although variations from this range are feasible and entirely permissible, since the amount to be used can readily be determined in any given instance by means of a few simple tests, and thus any amount may be utilized to suit the needs of the particular occasion. Ordinarily it is preferable to introduce an emulsion-breaking quantity of the water-soluble polymer of monoallylamine as a freshly prepared preformed water solution as this facilitates mixing and insures rapid dispersal of the demulsifying agent throughout the emulsion being treated.

The pH of the system under treatment pursuant to this invention may vary within relatively wide limits. For best results, the pH of the system should fall in the range of about 5 to about 10. In instances where free poly(monoallylamine) or an aqueous solution thereof is introduced into an aqueous system that contains free acid (e.g., aqueous HCl) the corresponding poly(monoallylammonium) salt may be formed in situ in the aqueous system being treated and thus reduce the acidity of the system.

In order to demonstrate the efficacy of the process of this invention, tests were conducted using a standard oil-in-water emulsion prepared by slowly adding 2.0 weight percent of a commercial SAE 10W30 motor oil to intensively agitated water containing 0.5 weight percent of an ethoxylated mixture of dodecyl and tetradecyl alcohols (average of three ethylene oxide units per molecule) as emulsifying agent. Samples of the resulting stable emulsion were placed in 500 mL beakers and while stirring these samples at 80-100 rpm measured quantities of freshly prepared aqueous solutions containing known quantities of polyallylamine hydrochloride produced by Nitto Boseki Co., Ltd. and having a weight average molecular weight of either 10,000 or 150,000 were introduced into the series of samples by means of a pipet. For comparative purposes another series of samples was prepared in the same manner using known quantities of a commercially-available demulsifying agent instead of the demulsifier of this invention. Stirring of all samples was continued at 80-100 rpm for two minutes after the addition of the polyallylamine hydrochloride. Thereupon the speed of stirring was reduced to 30 rpm and continued at this rate for fifteen minutes and then stopped. After allowing all of the samples to stand in the quiescent state for fifteen minutes, visual observations of each sample were made and recorded, and samples of the aqueous phases which had separated were withdrawn and analyzed for percentage of light transmittance by means of a spectrophotometer.

The results of these tests are summarized in Tables I through III. In these tables the demulsifiers are identified as follows:

A = Poly(monoallylammonium chloride), 150,000 Mw

B = Poly(monoallylammonium chloride), 10,000 Mw

C = Commercially-available demulsifying agent; reportedly the most widely used industrial demulsifier.

In the tests reported in Table I the pH of the emulsions was 6.0; in the tests of the other tables it was 6.5.

TABLE I

Use of a Demulsifier of This Invention

|  | Ex. 1 | Ex. 2 | Ex. 3 |
|---|---|---|---|
| Demulsifier | A | A | A |
| Concentration of Demulsifier, ppm | 100 | 200 | 300 |
| Clarity | — | Cloudy | Cloudy |
| % Light Transmittance | — | 22 | 15 |
| Phase Separation | Slight | Good | Good |
| Height of Floating Oil Floc, inch | — | ¼ | ¼ |

TABLE II

Comparative Effectiveness of a Demulsifier of This Invention versus a Commercial Demulsifier

|  | Ex. 4 | Ex. 5 | Ex. 6 | Comparative Ex. 1 | Comparative Ex. 2 |
|---|---|---|---|---|---|
| Demulsifier | A | A | A | C | C |
| Concentration of Demulsifier, ppm | 150 | 200 | 250 | 1,100 | 1,200 |
| Clarity | Almost Clear | Slightly Cloudy | Slightly Cloudy | — | Poor |
| % Light Transmittance | 71 | 78 | 75 | — | 37 |
| Phase Separation | Good | Good | Good | None | Good |
| Height of Floating Oil Floc, inch | ¼ | ⅜ | ⅜ | — | ¼ |

TABLE III

Comparative Effectiveness of a Demulsifier of This Invention versus a Commercial Demulsifier

|  | Ex. 7 | Ex. 8 | Ex. 9 | Ex. 10 | Comparative Ex. 3 | Comparative Ex. 4 |
|---|---|---|---|---|---|---|
| Demulsifier | B | B | B | B | C | C |
| Concentration of Demulsifier, ppm | 100 | 150 | 200 | 250 | 1,200 | 1,250 |
| Clarity | None | Good | Good | Good | Poor | Poor |
| % Light Transmittance | — | 65 | 69 | 71 | 11 | 5 |
| Phase Separation | — | Good | Good | Good | Poor | Poor |
| Height of Floating | — | ¼ | ⅜ | ⅜ | ¼ | ¼ |

TABLE III-continued

Comparative Effectiveness of a Demulsifier of
This Invention versus a Commercial Demulsifier

|  | Ex. 7 | Ex. 8 | Ex. 9 | Ex. 10 | Comparative Ex. 3 | Ex. 4 |
|---|---|---|---|---|---|---|
| Oil Floc, inch | | | | | | |

The data in Tables I–III indicate that with the emulsion used in these experiments the minimum optimum effectiveness level for the two demulsifiers of this invention was about 200 ppm whereas 1,200 ppm of the commercial demulsifier were required to break the emulsion, and even with this amount the results with the commercial material were less favorable.

A number of crosslinked water-soluble polymers of monoallylamine were produced as described in Examples 11–16.

EXAMPLE 11

A 33 weight percent solution of polyallylamine hydrochloride (Nitto Boseki Co., Ltd.) with a weight average molecular weight of 10,000 was prepared in a beaker using demineralized water. Using sodium hydroxide pellets, the pH of the solution was adjusted to 8.5. Then, 3,500 ppm of epichlorohydrin based on the weight of the original poly(monoallylammonium chloride) was added to the solution and the beaker was immersed in a preheated oil bath. Crosslinking was carried out at 75° C. for 30 minutes. The resulting solution was then cooled to 25° C. The resulting crosslinked product had an initial Brookfield Viscosity of 275 cps and subsequently became considerably more viscous.

EXAMPLE 12

The procedure of Example 11 was repeated in the same way with the exception that the proportion of the epichlorohydrin used was 5,000 ppm based on the weight of the initial monoallylamine polymer. The crosslinked product was a non-Newtonian fluid.

EXAMPLE 13

Utilizing the same procedure as in Example 11, polyallylamine hydrochloride (Nitto Boseki Co., Ltd.) having a weight average molecular weight of 150,000 was crosslinked with epichlorohydrin in the amount of 150 ppm based on the weight of the original polyallylamine hydrochloride. The crosslinked product was a non-Newtonian fluid.

EXAMPLE 14

A 30 weight percent solution of polyallylamine hydrochloride (Nitto Boseki Co., Ltd.) with a weight average molecular weight of 10,000 was prepared in a beaker using demineralized water. The solution was 50% neutralized by adding sodium hydroxide pellets (22 wt %) which increased the pH to 9.1. After the NaOH dissolved, the solution was transferred to a round bottomed flask equipped with a reflux condenser, and 8,000 ppm of ethylene dichloride based on the weight of the original monoallylamine polymer was added to the solution. The mixture was heated with stirring to 80° to 90° C. and held at this temperature for 30 to 60 minutes. The resulting solution was then cooled to 25° C. The crosslinked product exhibited an initial Brookfield Viscosity of 160 cps.

EXAMPLE 15

The procedure of Example 14 was repeated in the same way with the exception that the proportion of the ethylene dichloride used was 10,000 ppm based on the weight of the original poly(monoallylammonium chloride). The crosslinked product gave an initial Brookfield Viscosity of 414 cps.

EXAMPLE 16

Utilizing the same procedure as in Example 14, polyallylamine hydrochloride (Nitto Boseki Co., Ltd.) having a weight average molecular weight of 150,000 was crosslinked with ethylene dichloride in the amount of 50 ppm based on the weight of the original monoallylamine polymer.

Samples of the above-referred-to standard oil-in-water emulsion were treated with the respective crosslinked poly(monoallylamines) of Examples 11, 12 and 13 at a concentration of 200 ppm using the procedure described above. For comparative purposes two additional samples were prepared and tested in the same manner using known quantities (200 ppm and 1,200 ppm) of a commercially-available demulsifying agent instead of a demulsifier of this invention. A control sample containing no demulsifier was also subjected to the test. The results of these tests are summarized in Table IV.

TABLE IV

| | | Demulsification Tests | | | |
|---|---|---|---|---|---|
| Demulsifier | Conc. ppm | Clarity | % Light Trans- mittance | Phase Sepa- ration | Float- ing cm |
| Ex. 11 | 200 | Cloudy | 3 | Good | 0.5 |
| Ex. 12 | 200 | Sl. Cloudy | 16 | Good | 0.6 |
| Ex. 13 | 200 | Cloudy | 8 | Good | 0.4 |
| Commercial | 200 | Milky | 0 | Very Poor | —* |
| Commercial | 1200 | Poor | 5 | Good | 1.8 |
| None | — | Milky | 0 | Very Poor | —* |

*Only a few drops of oil separated - no definite layer was formed

In another group of tests, the above procedure was applied to the crosslinked products of Examples 14, 15, and 16, to a sample of polyallylamine hydrochloride ("PAA-HCl") as received from Nitto Boseki Co. Ltd., (weight average molecular weight, 150,000), and to a commercially-available demulsifier. The concentrations used and results obtained are summarized in Table V.

TABLE V

| | | Demulsification Tests | | |
|---|---|---|---|---|
| Demulsifier | Conc. ppm | % Light Transmittance | Phase Separation | Floating cm |
| Ex. 14 | 650 | 12 | Good | 2.0 |
| Ex. 15 | 850 | 12 | Good | 1.6 |
| Ex. 16 | 950 | 29 | Good | 1.2 |
| PAA-HCl | 200 | 12 | Good | 1.0 |
| Commercial | 1200 | 9 | Poor | 2.0 |

As will now be readily apparent to those skilled in the art, the demulsifiers of this invention may be employed for the treatment of a wide variety of oil-in-water emulsions including emulsions encountered in oil field operations or in industrial operations of various and sundry types, such as petroleum production and refining, mining, paper sizing operations, metal machining operations, and manufacture of chemicals, pharmaceuticals, personal care products, home care products, and the like.

In the practice of this invention use may be made of mixtures of different water-soluble polymers of monoallylamine of the type referred to hereinabove. Similarly, one or more such polymers of monoallylamine may be used in combination with previously known demulsifying agents, provided of course that each previously known demulsifying agent so used is chemically compatible with and does not impair the effectiveness of the demulsifier(s) of this invention with which it is used.

This invention is susceptible to considerable variation in its practice within the spirit and scope of the appended claims.

What is claimed is:

1. A process of demulsifying an oil-in-water emulsion which comprises admixing with the emulsion a water-soluble polymer of monoallylamine that causes formation of and separation between an oil phase and an aqueous phase to occur wherein said emulsion has a pH in the range of about 5 to about 10 and said polymer has a weight average molecular weight of at least 1000 and contains at least 95% by weight of monoallylamine.

2. A process of claim 1 in which the water-soluble polymer is an acid salt of said polymer.

3. A process of claim 1 in which the water-soluble polymer is poly(monoallylammonium chloride).

4. A process of claim 1 in which the water-soluble polymer is poly(monoallylamine).

5. A process of claim 1 in which the water-soluble polymer is a homopolymer.

6. A process of claim 1 in which the water-soluble polymer is a copolymer.

7. A process of claim 1 in which the water-soluble polymer is a crosslinked polymer.

8. A process of claim 1 in which the water-soluble polymer is a monoallylamine hydrochloride polymer having a weight average molecular weight in the range of about 5,000 to about 500,000.

9. A process of claim 1 in which the water-soluble polymer is represented by the formula:

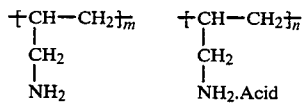

where m is a number from zero to about 100,000 and n is a number from zero to about 100,000, the sum of m plus n being in the range of about 10 to about 100,000.

10. A process of claim 9 in which the water-soluble polymer is a crosslinked polymer.

11. A process of removing organic matter from an aqueous medium containing emulsified liquid oleagenous matter as the disperse phase which comprises intermixing with the aqueous medium an amount of a water-soluble polymer of monoallylamine that causes demulsification in the aqueous medium, wherein said aqueous medium has a pH in the range of about 5 to about 10 and said polymer has a weight average molecular weight of at least 1000 and contains at least 95% by weight of monoallylamine, and physically separating the resultant aqueous phase and the demulsified organic phase.

12. A process of claim 11 in which the water-soluble polymer is an acid salt of said polymer.

13. A process of claim 11 in which the water-soluble polymer is poly(monoallylammonium chloride).

14. A process of claim 11 in which the water-soluble polymer is poly(monoallylamine).

15. A process of claim 11 in which the water-soluble polymer is a homopolymer.

16. A process of claim 11 in which the water-soluble polymer is a copolymer.

17. A process of claim 11 in which the water-soluble polymer is a crosslinked polymer.

18. A process of claim 11 in which the water-soluble polymer is a monoallylamine hydrochloride polymer having a weight average molecular weight of about 60,000.

19. A process of claim 11 in which the water-soluble polymer is represented by the formula:

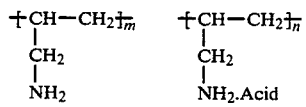

where m is a number from zero to about 100,000 and n is a number from zero to about 100,000, the sum of m plus n being in the range of about 10 to about 100,000.

20. A process of claim 19 in which said water-soluble polymer is crosslinked with a crosslinking agent having two or more groups reactable with the amino group.

21. A process of claim 11 in which the amount of said polymer intermixed with the aqueous medium is within the range of from about 50 to about 2,500 parts per million parts of the aqueous medium, and in which the polymer has a weight average molecular weight in the range of about 1,000 to about 500,000.

22. A process of claim 21 in which said weight average molecular weight is at least 5,000.

23. A process of claim 21 in which said weight average molecular weight is in the range of about 10,000 to about 200,000.

24. A process of breaking an emulsion composed of a discontinuous organic phase and a continuous aqueous phase which process comprises admixing with said emulsion a water-soluble polymer of monoallylamine that causes demulsification and separation of said organic phase from said continuous phase to occur, wherein said emulsion has a pH in the range of about 5 to about 10 and said polymer has a weight average molecular weight of at least 1000 and contains at least 95% by weight of monoallylamine.

25. A process of claim 24 in which the water-soluble polymer is represented by the formula:

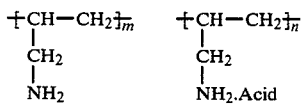

where m is a number from zero to about 100,000 and n is a number from zero to about 100,000, the sum of m plus n being in the range of about 10 to about 100,000.

26. A process of claim 25 in which said water-soluble polymer is crosslinked with a crosslinking agent having two or more groups reactable with the amino group.

27. A process of claim 24 in which the amount of said polymer intermixed with the aqueous medium is within the range of from about 50 to about 2,500 parts per million parts of the aqueous medium, and in which the polymer has a weight average molecular weight in the range of about 1,000 to about 500,000.

28. A process of claim 27 in which said weight average molecular weight is at least 5,000.

29. A process of claim 27 in which said weight average molecular weight is in the range of about 10,000 to about 200,000.

30. A process of claim 27 in which the water-soluble polymer used is poly(monoallylammonium chloride).

31. A process for demulsifying an oil-in-water emulsion which comprises admixing with an oil-in-water emulsion having a pH in the range of about 5 to about 10 a water-soluble polymer of monoallylamine having a weight average molecular weight of about 1,000 to about 500,000 and containing at least 95% by weight of monoallylamine, and in an amount that causes, formation of and separation between an oil phase and an aqueous phase to occur, and then effecting a separation between said oil phase and said aqueous phase.

32. A process of claim 31 in which said amount is within the range of from about 50 to about 2,500 parts per million parts by weight of the emulsion being treated.

33. A process of claim 31 in which the water-soluble polymer used is a homopolymer.

34. A process of claim 31 in which the water-soluble polymer used is a copolymer.

35. A process of claim 31 in which the water-soluble polymer used is a crosslinked polymer.

36. A process of claim 31 in which said weight average molecular weight is at least 5,000.

37. A process of claim 31 in which said weight average molecular weight is in the range of about 10,000 to about 200,000.

* * * * *